United States Patent
Dong et al.

(10) Patent No.: US 11,178,192 B2
(45) Date of Patent: Nov. 16, 2021

(54) METHOD AND DEVICE FOR FACILITATING CONNECTIVITY CHECK BETWEEN TERMINAL DEVICE AND MEDIA GATEWAY

(71) Applicant: Telefonaktiebolaget LM Ericsson (publ), Stockholm (SE)

(72) Inventors: Huoming Dong, Shanghai (CN); Julio Martinez Minguito, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 16/315,829

(22) PCT Filed: Jul. 19, 2016

(86) PCT No.: PCT/CN2016/090438
§ 371 (c)(1),
(2) Date: Jan. 7, 2019

(87) PCT Pub. No.: WO2018/014188
PCT Pub. Date: Jan. 25, 2018

(65) Prior Publication Data
US 2019/0319990 A1  Oct. 17, 2019

(51) Int. Cl.
*H04L 29/06* (2006.01)
*H04L 29/08* (2006.01)

(52) U.S. Cl.
CPC ...... *H04L 65/1046* (2013.01); *H04L 65/1026* (2013.01); *H04L 65/1069* (2013.01); *H04L 65/1073* (2013.01); *H04L 67/2823* (2013.01)

(58) Field of Classification Search
CPC .............. H04L 61/256; H04L 65/1016; H04L 61/2575; H04L 61/2564; H04L 61/2589
See application file for complete search history.

(56) References Cited

U.S. PATENT DOCUMENTS

| 8,601,144 | B1 | 12/2013 | Ryner |
| 2005/0149787 | A1* | 7/2005 | Choi ...................... H04L 12/66 714/724 |

(Continued)

FOREIGN PATENT DOCUMENTS

| CN | 101222502 A | 7/2008 |
| CN | 101536451 A | 9/2009 |

(Continued)

OTHER PUBLICATIONS

Extended European search report dated Jan. 28, 2020 for European Patent Application No. 16909118.8, 7 pages.

(Continued)

*Primary Examiner* — Kevin T Bates
*Assistant Examiner* — Emad Siddiqi
(74) *Attorney, Agent, or Firm* — Sage Patent Group (57) ABSTRACT

Embodiments of the present disclosure relate to a method and device for facilitating a connectivity check between a terminal device and a media gateway. In example embodiments, the session controller receives, via a web gateway associated with said terminal device, a request for establishing a real-time communication call and an indication for indicating a capability of said terminal device for early reception of a connectivity parameter of said media gateway to be used in said connectivity check. The session controller obtains said connectivity parameter from said media gateway. Then, in response to said connectivity parameter being obtained, the session controller sends said connectivity parameter via said web gateway towards said terminal device within a time limit. In this way, said terminal device may initiate said connectivity check to said media gateway earlier, and thus a latency of call establishment may be reduced significantly.

11 Claims, 4 Drawing Sheets

(56) References Cited

U.S. PATENT DOCUMENTS

| | | | |
|---|---|---|---|
| 2008/0172622 A1 | 7/2008 | Roche et al. | |
| 2008/0259909 A1* | 10/2008 | Runeson | H04L 65/1006 370/352 |
| 2009/0274146 A1* | 11/2009 | Zhu | H04L 29/12528 370/352 |
| 2010/0070636 A1* | 3/2010 | Skog | H04L 12/2834 709/228 |
| 2010/0105314 A1* | 4/2010 | Paila | H04N 21/4532 455/3.01 |
| 2011/0268018 A1* | 11/2011 | Wang | H04J 3/0667 370/328 |
| 2012/0023172 A1* | 1/2012 | Kumarasamy | H04L 65/1069 709/206 |
| 2012/0258712 A1* | 10/2012 | Rozinov | H04L 61/303 455/435.1 |

FOREIGN PATENT DOCUMENTS

| | | |
|---|---|---|
| EP | 2001204 A1 | 12/2008 |
| WO | 2012003533 A1 | 1/2012 |

OTHER PUBLICATIONS

"[MS-ICE2BWM]: Interactive Connectivity Establishment (ICE) 2.0 Bandwidth Management Extensions", XP055234313, Sep. 4, 2015, pp. 1-31.

\* cited by examiner

METHOD AND DEVICE FOR FACILITATING CONNECTIVITY CHECK BETWEEN TERMINAL DEVICE AND MEDIA GATEWAY

TECHNICAL FIELD

Embodiments of the present disclosure generally relate to the field of telecommunication, and in particular, to a method and device for facilitating a connectivity check between a terminal device and a media gateway.

BACKGROUND

A Web Real-Time Communication (WebRTC) technology, which is standardized by the World Wide Web Consortium (W3C), enables browser-based real-time communications, such as voice calling, video chat, file sharing, and the like. A WebRTC Gateway (WGw), which is based on web technologies such as Hyper Text Transport Protocol (HTTP), mediates between the WebRTC technology and a Voice over Internet Protocol (VoIP) technology, such as an IP (Internet Protocol) Multimedia Subsystem (IMS) technology.

The WGw may translate signaling protocols between internet services among different networks, e.g., between an internet domain and an IMS domain. By way of example, when the WGw receives a call from a WebRTC client or a terminal device, the WGw may determine whether a called party is reachable with the WebRTC technology. If the called party is unreachable with the WebRTC technology but reachable with the IMS technology, the WGw may translate the call into a protocol under the IMS technology, such as Session Initiation Protocol (SIP). In this way, the WGw enables real-time communications with the called party in the IMS domain to be accessed directly from within web browsers, and therefore the internet services may be integrated with the telecommunication networks.

Generally, a WebRTC client (or terminal device) is located behind a Network Address Translator (NAT) which translates a private IP address of the terminal device into a public IP address. An Interactive Connectivity Establishment (ICE) technique is used for NAT traversal for media streams established, for example, by a Session Description Protocol (SDP) offer/answer model. For example, after the terminal device initiates a WebRTC call, the terminal device performs an ICE negotiation with a media gateway (MGw) acting as an access gateway (AGw), which may enable a transfer of media streams between the terminal device and a core network, such as an IMS core network, via a Session Border Controller (SBC). In order to perform the ICE negotiation, the terminal device and the media gateway may exchange their ICE attributes by SIP signaling. The ICE attributes may include IP addresses, usernames, passwords, and the like to be used for a connectivity check between the terminal device and the MGw, for example. After the terminal device receives the ICE attributes of the MGw, the terminal device may initiate the connectivity check, such as an ICE Session Traversal Utilities for NAT (STUN) check, with the MGw.

However, the ICE negotiation is generally time-consuming, and the terminal device cannot initiate the ICE STUN request until it receives the ICE attributes of the MGw through SIP signaling. As a result, a long latency may be caused for establishment of media streams for the WebRTC call.

SUMMARY

In general, example embodiments of the present disclosure provide a method and device for facilitating a connectivity check between a terminal device and a media gateway.

In a first aspect, a method implemented in a session controller is provided for facilitating a connectivity check between a terminal device and a media gateway in a communication network. According to the method, the session controller receives, via a web gateway associated with the terminal device, a request for establishing a real-time communication call and an indication for indicating a capability of the terminal device for early reception of a connectivity parameter of the media gateway to be used in the connectivity check. The session controller obtains the connectivity parameter from the media gateway. Then, in response to the connectivity parameter being obtained, the session controller sends the connectivity parameter via the web gateway towards the terminal device within a time limit. A computer program product for carrying out this method is also provided.

In some embodiments, the indication may be included in the request, so that the indication can be received together with the request.

In some embodiments, the indication may be received via the web gateway during registration of the terminal device to the communication network, while the request may be received via the web gateway during initiation of the real-time communication call by the terminal device.

In some embodiments, the connectivity parameter may be sent to the terminal device via the web gateway, immediately after the connectivity parameter is obtained from the media gateway.

In a second aspect, a method implemented in a web gateway is provided for facilitating a connectivity check between a terminal device associated with the web gateway and a media gateway in a communication network. The method comprises receiving, from the terminal device, a request for establishing a real-time communication call and an indication for indicating a capability of the terminal device for early reception of a connectivity parameter of the media gateway to be used in the connectivity check. The method also comprises informing a session controller of the request and the indication, in response to the informing of the request, receiving the connectivity parameter via the session controller within a time limit, and sending the connectivity parameter to the terminal device. A computer program product for carrying out this method is also provided.

In a third aspect, a method implemented in a terminal device is provided for facilitating a connectivity check between the terminal device and a media gateway in a communication network. The method comprises sending, to a web gateway associated with the terminal device, a request for establishing a real-time communication call and an indication for indicating a capability of the terminal device for early reception of a connectivity parameter of the media gateway to be used in the connectivity check. The method also comprises receiving the connectivity parameter from the web gateway within a time limit, in response to the request being sent. A computer program product for carrying out this method is also provided.

In a fourth aspect, a session controller in a communication network is provided. The session controller comprises a receiving unit, a parameter obtaining unit, and a sending unit. The receiving unit is configured to receive, via a web gateway associated with a terminal device, a request for establishing a real-time communication call and an indication for indicating a capability of the terminal device for early reception of a connectivity parameter of a media gateway to be used in a connectivity check between the terminal device and the media gateway. The parameter obtaining unit is configured to obtain the connectivity parameter from the media gateway. The sending unit is configured to, in response to the connectivity parameter being obtained, send the connectivity parameter via the web gateway towards the terminal device within a time limit.

In a fifth aspect, a web gateway in a communication network is provided. The web gateway comprises a first and second receiving unit, an informing unit and a sending unit. The first receiving unit is configured to receive, from a terminal device associated with the web gateway, a request for establishing a real-time communication call and an indication for indicating a capability of the terminal device for early reception of a connectivity parameter of a media gateway to be used in a connectivity check between the terminal device and the media gateway. The informing unit is configured to inform a session controller of the request and the indication. The second receiving unit is configured to, in response to the informing of the request, receive the connectivity parameter via the session controller within a time limit. The sending unit is configured to send the connectivity parameter to the terminal device.

In a sixth aspect, a terminal device in a communication network is provided. The terminal device comprises a sending unit and a receiving unit. The sending unit is configured to send, to a web gateway associated with the terminal device, a request for establishing a real-time communication call and an indication for indicating a capability of the terminal device for early reception of a connectivity parameter of a media gateway to be used in a connectivity check between the terminal device and the media gateway. The receiving unit is configured to, in response to the request being sent, receive the connectivity parameter from the web gateway within a time limit.

In a seventh aspect, there is provided an apparatus at a session controller in a communication network. The apparatus comprises a processor and a memory. The memory contains instructions executable by the processor, whereby the apparatus is operative to perform the method according to the first aspect.

In an eighth aspect, there is provided an apparatus at a web gateway in a communication network. The apparatus comprises a processor and a memory. The memory contains instructions executable by the processor whereby the apparatus is operative to perform the method according to the second aspect.

In a ninth aspect, there is provided an apparatus at a terminal device in a communication network. The apparatus comprises a processor and a memory. The memory contains instructions executable by the processor whereby the apparatus is operative to perform the method according to the third aspect.

In a tenth aspect, there is provided a computer program product that is tangibly stored on a computer readable storage medium. The computer program product includes instructions which, when executed on at least one processor, cause the at least one processor to carry out the method according to the first, second or third aspect.

Through the following description, it would be appreciated that according to embodiments of the present disclosure, the session controller may send, via the web gateway, towards the terminal device, the connectivity parameter of the media gateway that is to be used in the connectivity check between the terminal device and the media gateway. In this way, the latency for establishment of a real-time communication call between the terminal device and the media gateway may be reduced significantly.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities that enables a real-time communication. Examples of the terminal device include, but not limited to, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the term "session controller" refers to a network device for controlling procedures of sessions or calls, and correlating signaling and media passing through a communication network. The term typically refers to those entities of the communication network handling control plane, subscriber data, services, or signaling traffic associated with user traffic in a communication network, and controlling media resources and media nodes. Examples of the session controller include, but not limited to, a Mobile Switching Center (MSC), a Mobility Management Entity (MME), a Serving Gateway Support Node (SGSN), a Session Border Controller (SBC), a Proxy Call Session Control Function (P-CSCF), a Serving-CSCF (S-CSCF), or a Telephony Application Server (TAS). Several of those entities may be co-located in a single physical node. For example, a SBC/P-CSCF combination combines the IMS core border control with the proxy session control function of IMS.

As used herein, the term "web gateway" refers to a device or proxy associated with the terminal device that may translate application layer protocols and also change the transport and network layer. The web gateway may translate, for example, web protocols, such as HTTP protocols, into IMS protocols, such as SIP protocols, and vice versa. By means of the web gateway, the terminal device may communicate with the IMS core network, for example.

As used herein, the term "media gateway" refers to a device implementing a media border of the core network. Through a media channel between the terminal device and the media gateway, the terminal device may transmit media streams towards a further terminal device behind the core network.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
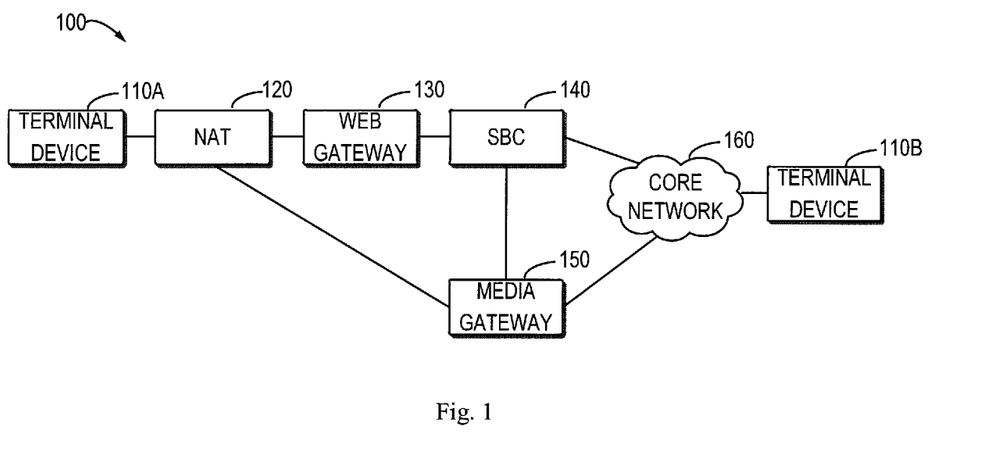
FIG. 1 is a block diagram of a communication network in which embodiments of the present disclosure can be implemented.

FIG. 1 shows an example communication network 100 in which embodiments of the present disclosure can be implemented. The network 100 includes two terminal devices 110A and 110B (collectively referred to as "terminal devices" 110). It is to be understood that although two terminal devices 110 are shown, this is only for the purpose of illustration without suggesting any limitations as to the scope of the present disclosure. The network 100 may include any suitable number of the terminal devices 110.

In this example, as shown, the terminal device 110A is located behind a NAT 120, which may translate a private IP address of the terminal device 110A to a public IP address within the communication network 100, thereby separating an IP addressing space of the terminal device 110A from the rest of the communication network 100. The NAT 120 may also protect the terminal device 110 from unsolicited access from outside. The NAT 120 is connected to a web gateway 130. The web gateway 130 is connected to a SBC 140 in a control plane, which acts as a session controller in this example. The NAT 110 is further connected with a media gateway 150 in a media plane.

The SBC 140 controls the media gateway 150 via a control interface using for example International Telecommunication Union Telecommunication Standardization Sector (ITU-T) H. 248 protocol. Via this control interface, the SBC 140 can instruct the media gateway 150 to forward a stream of data packets from the NAT 120 to the IMS core network 160 as an example of the core network, and vice versa. The media gateway 150 may also be instructed by the SBC 140 to perform media conversion functions such as transcoding, re-framing, voice stream volume adjustments or noise/echo cancellation on the forwarded packet stream.

The SBC 140 and the media gateway 150 then connect to the IMS core network 160 via control plane and media plane connections, respectively. The terminal device 110B is reachable from the IMS core network 160. These network elements may enable a real-time communication call initiated by the terminal device 110A towards the terminal device 110B. In the context of the present disclosure, the real-time communication call refers to real-time communications, for example, based on web technology, such as voice calling, video chat, file sharing, and the like. In this example, the real-time communication call is implemented as a WebRTC call.

In order to enable such communications, there is a need to establish a media channel between the terminal device 110A and the media gateway 150. Before the establishment of the media channel, the terminal device 110A and the media gateway 150 have to perform a connectivity check. They may need to exchange connectivity parameters to be used in the connectivity check. In the context of the present disclosure, the connectivity parameter refers to any suitable parameter, such as an address, username, password, and the like to be used in the connectivity check between the terminal device 110A and the media gateway 150. For example, the connectivity parameter may include the ICE attributes which are exchanged between the terminal device 110A and the media gateway 150 during the ICE negotiation, as described above.

In order to perform the connectivity check, in a conventional method, the terminal device 110A first sends, via the NAT 120 and to the web gateway 130, a request for establishing a real-time communication call, for example, by sending a HTTP POST message including a SDP offer. Upon accepting the request from the terminal device 110A, the web gateway 130 sends confirmation to the terminal device 110A and forwards the request to the SBC 140, for example, using a SIP INVITE message. The SBC 140 then requests the media gateway 150, for example, in a H.248 ADD message including the ICE attributes of the terminal device 110A, to add two terminations, including both a terminal device side termination and a core side termination. As a response, the media gateway 150 may reply the SBC 140 with its own ICE attributes, for example, in a H.248 ADD Reply message.

After receiving the reply from the media gateway 150, the SBC 140 proceeds with a SIP session setup towards the IMS core network 160. After receiving a response from the IMS core network 160, the SBC 140 may communicate with the media gateway 150 again to update the core side termination. After that, the SBC 140 sends call progress state information and media information (SDP answer) from the access gateway including the ICE attributes of the media gateway 150 to the web gateway 130, for example, in an 18x/200 OK message. The web gateway 130 then sends to the terminal device 110A a HTTP Event message including a SDP Answer and the ICE attributes of the media gateway 150 as a response to the request sent from the terminal device 110A for establishing the real-time communication call. At this point, the terminal device 110A may initiate the connectivity check with the media gateway 150.

In the above conventional method, the terminal device 110A has to wait completion of the complicated and time-consuming procedure as described above before initiating the connectivity check with the media gateway 150. This may cause a very long latency, for example, up to tens of seconds, for the real-time call establishment, thereby degrading user experience.

It is to be understood that although some specific implementations are described above with reference to FIG. 1, this is merely for the purpose of illustration. For example, the use of NAT 120 is only for the purpose of illustration without suggesting any limitation. In some embodiments, the functions related to the address translation, the unsolicited access protection, and the like may be performed by any other suitable external or internal components of the terminal device 110A.

Furthermore, the session controller is not necessarily implemented as the SBC 140. The session controller may also be implemented as a P-CSCF, an SGSN, and the like. The IMS core network 160 is only an example of the core network. Any other suitable implementations of the core network are possible as well. In addition, depending on specific implementations, some components as shown may be removed, and some components may be added to the communication network 100.

Additionally, the communication of the terminal devices 110 through the communication network 100 may conform to any suitable wired or wireless communication standards including, but not limited to, asymmetric digital subscriber line (ADSL), Institute of Electrical and Electronics Engineers (IEEE) 802.11x, IEEE 802.16x, LTE-Advanced (LTE-A), LTE, Wideband Code Division Multiple Access (WCDMA), Code Division Multiple Access (CDMA) and Global System for Mobile Communications (GSM) and the like. Furthermore, the communications may be performed according to any generation of communication protocols either currently known or to be developed in the future. Examples of the communication protocols include, but not limited to, the first generation (1G), the second generation (2G), 2.5G, 2.75G, the third generation (3G), the fourth generation (4G), 4.5G, the future fifth generation (5G) communication protocols.

In order to solve the above and other potential problems, embodiments of the present disclosure allow the SBC 140 to early send, via the web gateway 130, the connectivity parameter of the media gateway 150 towards the terminal device 110A. For example, after the SBC 140 obtains the connectivity parameter from the media gateway 150, the SBC 140 may immediately send the connectivity parameter towards the terminal device 110A. In this way, the terminal device 110A may obtain the connectivity parameter of the media gateway 150 earlier, compared to the conventional method as described above. Detailed example implementations of the SBC 140, the web gateway 130 and the terminal device 110A will be described with reference to FIG. 2.

Figure 2:
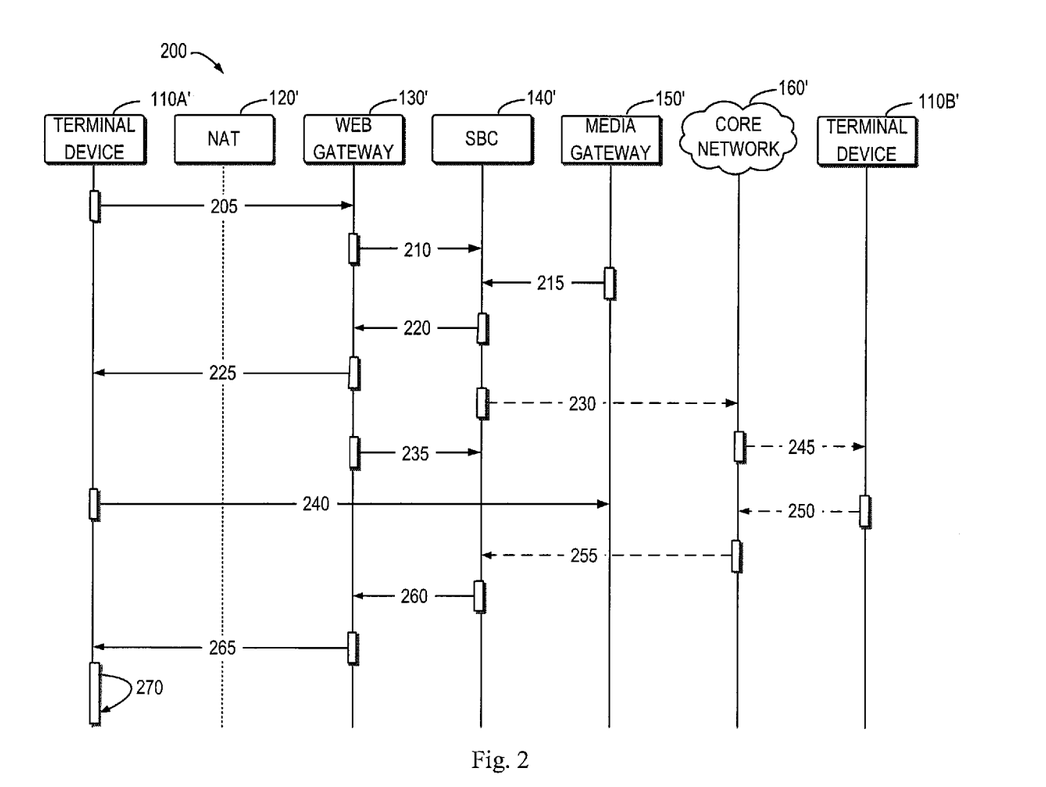
FIG. 2 is a communication and processing procedure among the elements in the communication network according to some embodiments of the present disclosure.

FIG. 2 illustrates an example communication and processing procedure 200 among various network elements in a communication network according to some embodiments of the present disclosure. It is to be understood that a few acts/steps in the procedure 200 may not be necessary. In some other embodiments, these acts/steps may be omitted, as will be described below in detail.

As shown, at 205, the terminal device 110A' sends, via the NAT 120' and to the web gateway 130, a request for establishing a real-time communication call, for example, towards the terminal device 110B'. In this example, as shown, all communications of the terminal device 110A' are transferred via the NAT 120' to separate the IP address spaces of the terminal device 110A' from the rest of the communication network. The operations of the NAT 120' are known, and detailed descriptions thereof will be omitted.

The terminal device 110A' may also send, at 205, to the web gateway 130' an indication for indicating a capability of the terminal device 110A' for early reception of a connectivity parameter of the media gateway 150'. The connectivity parameter is to be used in a connectivity check between the terminal device 110A' and the media gateway 150'. Then, the web gateway 130' informs, at 210, the SBC 140' of the request and the indication. For example, the web gateway 130' may convert the request sent at 205 from the terminal device in the HTTP to a further request in the SIP. Likewise, the format of the indication may also be changed. Then, the web gateway 130' may send the converted request and indication to the SBC 140'. In this example, the SBC 140' acts as an example of the session controller. As described above, other implementations of the session controller are possible. With this indication, the terminal device 110A' may indicate its capability of the early reception of the connectivity parameter to the SBC 140'. With the knowledge of this capability, the SBC 140' can know that early sending of the connectivity parameter towards the terminal device 110A' is feasible. The embodiments in this aspect will be described in the following paragraphs. It shall be appreciated that the terms "early reception" and "early sending" used herein mean that the reception or sending of the connectivity parameter during the establishment of a real-time communication call is earlier, compared to the conventional method as described above.

The request and the indication may be sent in a suitable timing. In some embodiments, the terminal device 110A' may send, at 205, the request and the indication in response to initiating the real-time communication call. The request and the indication may be sent together in any suitable ways. As an example, the indication may be included in the request. Accordingly, the request and indication may be sent, at the same time, from the terminal device 110A' to the web gateway 130', which then forwards them to the SBC 140'.

Furthermore, the request and the indication may be sent in suitable messages. By way of example, the terminal device 110A' may send to the web gateway 130" the request in a HTTP POST message that encapsulates the indication in a header or body thereof. Then, the web gateway 130" sends the request to the SBC 140' in a SIP INVITE message that also encapsulates the indication in a header or body thereof.

It is to be understood that the sending of the request and the indication in one action as shown in FIG. 2 is only for the purpose of illustration without suggesting any limitations. In some other embodiments, sending of the request and the indication by the terminal device 110A' and/or informing of the request and the indication by the web gateway 130' may be performed separately in two different actions. For example, the request may be sent when the terminal device 110A' initiates the real-time communication call towards the terminal device 110B'. The indication may be sent when the terminal device 110A' initially registers to the communication network. By way of example, during the registration of the terminal device 110A' to the communication network, the indication may be sent from the terminal device 110A', via the web gateway 130', to the SBC 140', in a SIP REGISTER/HTTP Request message. The indication may alternatively be sent in response to event triggering.

The terminal device 110A' may send the indication in response to a query from the network side, for example.

After the SBC 140' receives the request and the indication from the web gateway 130', the SBC 140' obtains, at 215, the connectivity parameter from the media gateway 150'. For example, the SBC may receive from the media gateway 150' media resource information including the connectivity parameter. In some embodiments, the SBC 140' may obtain the connectivity parameter from the media gateway 150' during the adding of the two side terminations, as described above. For example, the SBC 140' may send a H.248 ADD message to the media gateway 150' and then receive from the media gateway 150' a H.248 ADD Reply message including the connectivity parameter. It is to be understood that other methods for obtaining the connectivity parameter of the media gateway are also possible.

After obtaining, at 215, the connectivity parameter from the media gateway 150', according to embodiments of the present disclosure, the SBC 140' sends at 220 the connectivity parameter to the web gateway 130' within a time limit. For the purpose of illustration, the time limit will be referred to as a "first time limit." The first time limit may be a time interval which may be varied according to actual requirements and preferably shorter than the general time period between the obtaining and sending of the connectivity parameter at the SBC 140 during the conventional method as described above. In some embodiments, the first time limit may be a time duration as short as possible. For example, once the SBC 140' obtains the connectivity parameter, the SBC 140' may immediately send at 220 the connectivity parameter. In this way, the terminal device 110A' may obtain the connectivity parameter of the media gateway 150' earlier, as will be described in the following paragraphs.

The early sending of the connectivity parameter from the SBC 140' to the web gateway 130' may be implemented in a suitable message. For example, the connectivity parameter may be sent from the SBC 140' by using a new message or reusing an existing message. In some embodiments, a new SIP request outside the ongoing SIP dialog, e.g. SIP OPTIONS may be used. For example, the SBC 140' may send the connectivity parameter of the media gateway 150' composed within SIP header(s) or the SDP Offer in a SIP OPTIONS message. In some other embodiments, a SIP provisioning response within the ongoing SIP dialog, e.g. 183, may be used to send the connectivity parameter. The connectivity parameter may also be composed in SIP header(s) or the SDP Answer in a 183 OK message. In order to comply with the standards of 3GPP, such as Internet Engineering Task Force (IETF) RFC 3261, RFC 3264, RFC 6337, and 3GPP TS 24.229, where there is generally no two (different) SDP Answers within one dialog, the SBC 140' may create a new early dialog towards the web gateway 140' or the terminal device 110A'.

According to embodiments of the present disclosure, the web gateway 130' enables the early reception of the connectivity parameter sent by the SBC 140'. Likewise, the web gateway 130' may receive the connectivity parameter from the SBC 140' early in a new message or a reused existing message. In this way, the web gateway 130' may receive the connectivity parameter from the SBC 140' within a time limit (referred to as a "second time limit") after informing, at 210, the SBC 140' of the request for establishing the real-time communication call. According to embodiments of the present disclosure, the second time limit relies on the first time limit associated with the sending of the connectivity parameter by the SBC 140'. Furthermore, the second time limit may be related to a transmission delay and/or a capability of the web gateway 130' for data processing.

After receiving the connectivity parameter from the SBC 140', the web gateway 130' sends at 225 the connectivity parameter to the terminal device 110A'. Generally, the web gateway 130' forwards information between the terminal device 110A' and the SBC 140'. The sending of the connectivity parameter from the web gateway 130' to the terminal device 110A' may also be implemented in a suitable message, for example, in a new message or a reused existing message. Accordingly, the sending, at 225, of the connectivity parameter may be performed by the web gateway 130' immediately after receiving the connectivity parameter from the SBC 140', for example. In this way, the terminal device 110A' may receive the connectivity parameter from the web gateway 130' within a time limit (referred to as a "third time limit") after sending, at 205, the request to the web gateway 130'. Likewise, the third time limit relies on the first time limit associated with the sending of the connectivity parameter by the SBC 140'. Further, the third time limit also relies on the second time limit related to web gateway 130'. In addition, the third time limit may be related to the transmission delay and/or capabilities of the web gateway 130' and the terminal device 110A' for data processing.

Any suitable message may be used by the web gateway 130' to send the connectivity parameter to the terminal device 110A'. For example, the web gateway 130' may send a HTTP EVENT message including the connectivity parameter to the terminal device 110A'.

Optionally, after receiving the connectivity parameter from the SBC 140', the web gateway 130' sends at 235 an acknowledgement for the received parameter. The acknowledgement may be implemented in a suitable message. In this way, the SBC 140' may confirm the successful transmission of the connectivity parameter. If no acknowledgement is received from the web gateway 130', the SBC 140' may send the connectivity parameter again. Any suitable re-sending methods may be used by the SBC 140', and the detailed description thereof will be omitted.

After receiving the connectivity parameter from the web gateway 130', the terminal device 110A' may initiate at 240 the connectivity check, such as the ICE STUN connectivity check, with the media gateway 150'. In this way, the terminal device 110A' and the media gateway 150' may perform the connectivity check without waiting for the completion of the conventional lengthy procedure before the connectivity check. Accordingly, the latency of the establishment of the real-time communication call may be reduced significantly.

As shown, after the SSC 140' sends at 220 the connectivity parameter to the web gateway 130', the SBC 140' optionally communicates at 230 with the core network 160'. For example, the SBC 140' may proceed with a SIP session setup towards the core network 160'. Optionally, the SBC 140' may also communicate with the media gateway 150' (not shown). Furthermore, optionally, the core network 160' communicates at 245 and 250 with the terminal device 110B', for example, via elements associated with the terminal device 110B'.

Optionally, the SBC 140' receives at 255 from the core network 160'. Then, optionally, the SBC 140' sends at 260, for example, in a 18x/200 OK message including SDP Answer, a response to the request for establishing the real-time communication call informed at 210 by the 110A' web gateway 130'. For the purpose of backward compatibility, in some embodiments, in compliance with the standards, the response may also encapsulate the connectivity parameter of the media gateway 150'. Then, optionally, the web gateway 130' sends at 265 the response to the terminal device 110A', for example, in a HTTP Event message which may also encapsulate the connectivity parameter. In this example, the terminal device 110A' ignores at 270 the connectivity parameter received at this time. In this way, unnecessary processing will be avoided, and therefore the processing resources of the terminal device 110A' may be saved. As another example, the terminal device 110A' may also use the connectivity parameter received at 265 from the web gateway 130' for the consistency check purpose. The subsequent operations of the terminal device 110A' are known, and the details thereof will be omitted.

In some other embodiments, the response sent at 260 from the SBC 140' may not include the connectivity parameter of the media gateway 150'. Accordingly, after the terminal device 110A' receives the response, the terminal device 110A' has no operation related to the connectivity parameter to be performed.

Figure 3:
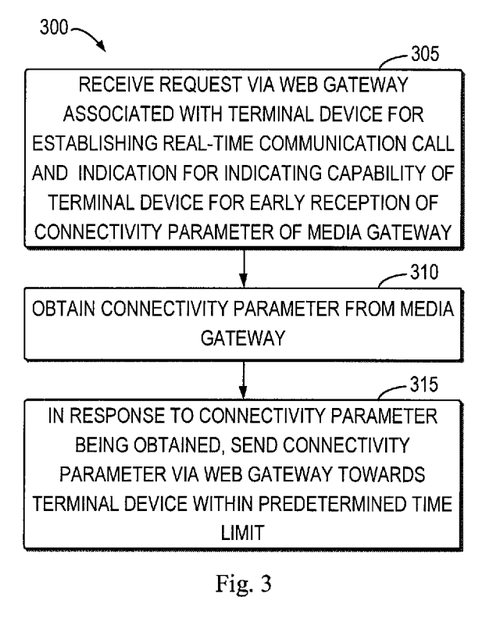
FIG. 3 is a flowchart of a method for facilitating a connectivity check between a terminal device and a media gateway in accordance with some embodiments of the present disclosure.

FIG. 3 shows a flowchart of an example method 300 for facilitating a connectivity check between a terminal device and a media gateway in accordance with some embodiments of the present disclosure. The method 300 can be implemented in the SBC 140' as shown in FIGS. 1 and 2. For the purpose of discussion, the method 300 will be described with reference to FIGS. 1 and 2.

In block 305, the SBC 140' receives, via the web gateway 130' associated with the terminal device 110A', a request for establishing a real-time communication call and an indication for indicating a capability of the terminal device for early reception of a connectivity parameter of the media gateway 150' to be used in the connectivity check. Then, in block 310, the SBC 140' obtains the connectivity parameter from the media gateway 150'. Next, in response to the connectivity parameter being obtained, the SBC 140' sends the connectivity parameter towards the terminal device 110A' within a time limit.

In some embodiments, the request may include the indication. Accordingly, the SBC 140' may receive the request including the indication via the web gateway 130'. In some other embodiments, the SBC 140' may receive the indication via the web gateway 130' during registration of the terminal device 110A' to the communication network. Then, the SBC 140' may receive the request via the web gateway 130' during initiation of the real-time communication call by the terminal device 110A'.

In some embodiments, the SBC 140' may send the connectivity parameter to the terminal device 110A' via the web gateway 130', immediately after obtaining the connectivity parameter from the media gateway 150'.

In some embodiments, the SBC 140' may further receive from the web gateway 130' an acknowledgement for the connectivity parameter.

Figure 4:
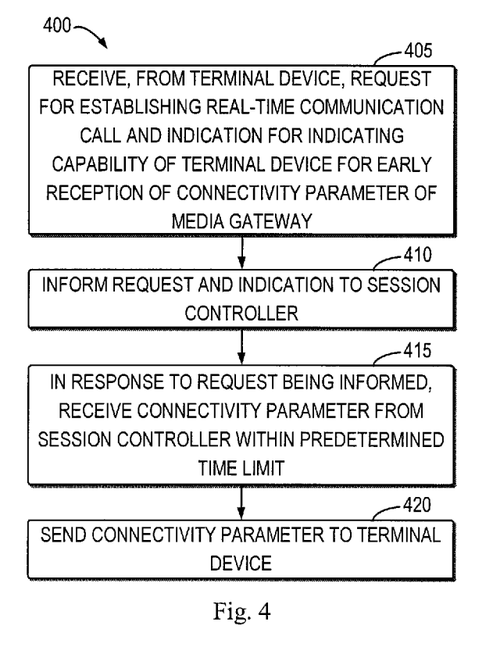
FIG. 4 is a flowchart of a method for facilitating a connectivity check between a terminal device and a media gateway in accordance with some other embodiments of the present disclosure.

FIG. 4 shows a flowchart of an example method 400 for facilitating a connectivity check between a terminal device and a media gateway in accordance with some embodiments of the present disclosure. The method 400 can be implemented in the web gateway 130' as shown in FIG. 2. For the purpose of discussion, the method 400 will be described with reference to FIG. 2.

As shown, in block 405, the web gateway 130' receives, from the terminal device 110A', a request for establishing a real-time communication call and an indication for indicating a capability of the terminal device 110A' for early reception of a connectivity parameter of the media gateway 150' to be used in the connectivity check. In block 410, the web gateway 130' informs the SBC 140' of the request and the indication. Then, in block 415, in response to the informing of the request, the web gateway 130' receives the connectivity parameter from the SBC 140' within a time limit. Next, in block 420, the web gateway 130' sends the connectivity parameter to the terminal device 110A'.

In some embodiments, the request may include the indication. Accordingly, the web gateway 130' may receive from the terminal device 110A' and send to the SBC 140' the request including the indication. In some other embodiments, the web gateway 130' may receive from the terminal device 110A' and inform the SBC 140' of the indication during registration of the terminal device 110A' to the communication network. Then, the web gateway 130' may receive from the terminal device 110A' and inform the SBC 140' of the request during initiation of the real-time communication call by the terminal device 110A'.

In some embodiments, the web gateway 130' may send to the SBC an acknowledgement for the connectivity parameter.

Figure 5:
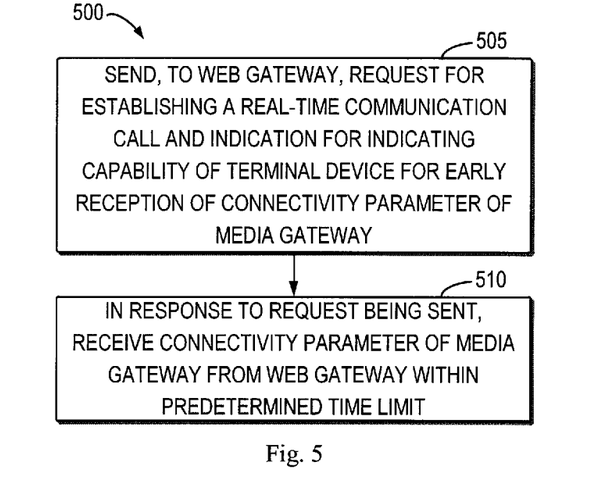
FIG. 5 is a flowchart of a method for facilitating a connectivity check between a terminal device and a media gateway in accordance with yet other embodiments of the present disclosure.

FIG. 5 shows a flowchart of an example method 500 for facilitating a connectivity check between a terminal device and a media gateway in accordance with some embodiments of the present disclosure. The method 500 can be implemented in the terminal device 110A' as shown in FIGS. 1 and 2. For the purpose of discussion, the method 500 will be described with reference to FIG. 2.

As shown, in block 505, the terminal device 110A' sends, to the web gateway 130' associated with the terminal device 110A', a request for establishing a real-time communication call and an indication for indicating a capability of the terminal device 110A' for early reception of a connectivity parameter of the media gateway 150' to be used in the connectivity check. Then, in block 510, in response to the request being sent, the terminal device 110A' receives the connectivity parameter from the web gateway 130' within a time limit.

In some embodiments, the indication may be included in the request. Accordingly, the terminal device 110A' may send the request including the indication. In some other embodiments, the terminal device 110A' sends the indication to the web gateway 130' during registration to the communication network. Then, the terminal device 110A' sends the request to the web gateway 130' during initiation of the real-time communication call.

In some embodiments, in response to the request being sent, the terminal device 110A' receives the connectivity parameter from the web gateway 130' after the time limit. In this example, the terminal device 110A' ignores the connectivity parameter received after the time limit.

It should be appreciated that all operations and features related to the SBC 140', the web gateway 130', and the terminal device 110A' described above with reference to FIG. 2 are likewise applicable to the methods 300, 400, and 500 and have similar effects. For the purpose of simplification, the details will be omitted.

Figure 6:
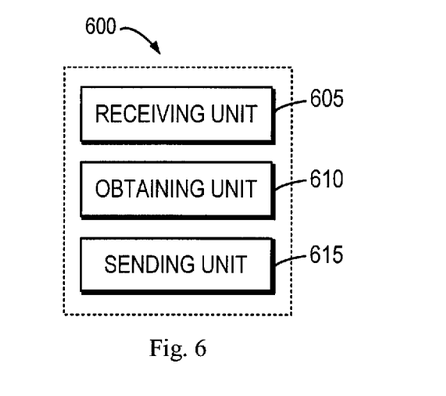
FIG. 6 is a block diagram of a session controller in accordance with some embodiments of the present disclosure.

FIG. 6 shows a block diagram of a session controller 600 in accordance with some embodiments of the present disclosure. The session controller 600 can be considered an example implementation of the SBC 140' as shown in FIG. 2.

As shown, the session controller 600 comprises: a receiving unit 605 configured to receive, via a web gateway associated with a terminal device, a request for establishing a real-time communication call and an indication for indicating a capability of the terminal device for early reception of a connectivity parameter of a media gateway to be used in a connectivity check between the terminal device and the media gateway; an obtaining unit 610 configured to obtain the connectivity parameter from the media gateway; and a sending unit 615 configured to, in response to the connectivity parameter being obtained, send the connectivity parameter via the web gateway towards the terminal device within a time limit.

In some embodiments, the receiving unit 605 may be further configured to: receive the request from the web gateway, wherein the request includes the indication.

In some embodiments, the receiving unit 605 may be further configured to: receive the indication via the web gateway during registration of the terminal device to the communication network; and receive the request via the web gateway during initiation of the real-time communication call by the terminal device.

In some embodiments, the sending unit 615 may be further configured to: send the connectivity parameter to the terminal device via the web gateway, immediately after obtaining the connectivity parameter from the media gateway.

In some embodiments, the receiving unit 605 may be further configured to: receive from the web gateway an acknowledgement for reception of the connectivity parameter.

Figure 7:
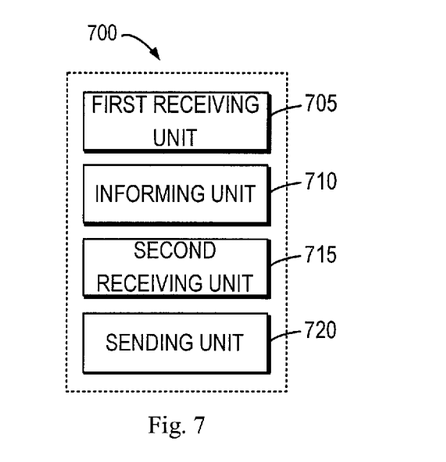
FIG. 7 is a block diagram of a web gateway in accordance with some embodiments of the present disclosure.

FIG. 7 shows a block diagram of a web gateway 700 in accordance with some embodiments of the present disclosure. The web gateway 700 can be considered an example implementation of the web gateway 130' as shown in FIG. 2.

As shown, the web gateway 700 comprises: a first receiving unit 705 configured to receive, from a terminal device associated with the web gateway, a request for establishing a real-time communication call and an indication for indicating a capability of the terminal device for early reception of a connectivity parameter of a media gateway to be used in a connectivity check between the terminal device and the media gateway; an informing unit 710 configured to send the request and the indication to a session controller; a second receiving unit 715 configured to, in response to the request being sent, receive the connectivity parameter from the session controller within a time limit; and a sending unit 720 configured to send the connectivity parameter to the terminal device.

In some embodiments, the request may include the indication. In some other embodiments, the first receiving unit 705 may be further configured to: receive the indication from the terminal device during registration of the terminal device to the communication network; and receive the request from the terminal device during initiation of the real-time communication call by the terminal device.

In some embodiments, the informing unit 710 may be further configured to: inform the session controller of the indication during the registration of the terminal device to the communication network; and inform the session controller of the request during the initiation of the real-time communication call by the terminal device.

In some embodiments, the web gateway 700 may further comprise: a further sending unit configured to send to the session controller an acknowledgement for the reception of the connectivity parameter.

Figure 8:
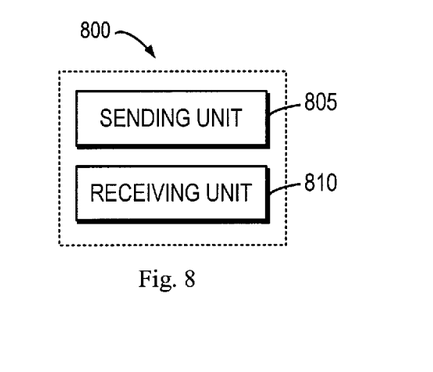
FIG. 8 is a block diagram of a terminal device in accordance with some embodiments of the present disclosure.

FIG. 8 shows a block diagram of a terminal device 800 in accordance with some embodiments of the present disclosure. The terminal device 800 can be considered an example implementation of the terminal device 110A' as shown in FIG. 2.

As shown, the terminal device 800 comprises: a sending unit 805 configured to send, to a web gateway associated with the terminal device, a request for establishing a real-time communication call and an indication for indicating a capability of the terminal device for early reception of a connectivity parameter of a media gateway to be used in a connectivity check between the terminal device and the media gateway; and a receiving unit 810 configured to, in response to the request being sent, receive the connectivity parameter from the web gateway within a time limit.

In some embodiments, the indication may be included in the request. In some other embodiments, the sending unit 810 may be further configured to: send the indication to the web gateway during registration to the communication network; and send the request to the web gateway during initiation of the real-time communication call.

In some embodiments, the receiving unit 805 may be further configured to, in response to the request being sent, receive the connectivity parameter from the web gateway after the time limit. In these embodiments, the terminal device 800 may further comprise: a processing unit configured to ignore the connectivity parameter received after the time limit.

It should be appreciated that units included in the session controller 600, the web gateway 700, and the terminal device 800 correspond to the blocks of the methods 300, 400, and 500. Therefore, all operations and features described above with reference to FIGS. 1 to 5 are likewise applicable to the units included in the session controller 600, the web gateway 700, and the terminal device 800 and have similar effects. For the purpose of simplification, the details will be omitted.

The units included in the session controller 600, the web gateway 700, and the terminal device 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the terminal device 500 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 9:
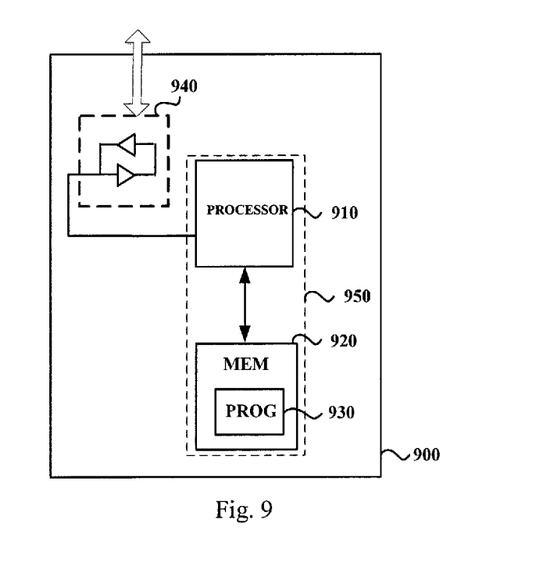
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the SBC 140', the web gateway 130', or the terminal device 110A' as shown in FIG. 2. Accordingly, the device 900 can be implemented at or as at least part of the terminal device 110A', the web gateway 130', and the SBC 140', respectively.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIGS. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 910 may form processing means 950 adapted to implement various embodiments of the present disclosure.

The memory 910 may be of any type suitable to the local technical environment and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 910 is shown in the device 900, there may be several physically distinct memory modules in the device 900. The processor 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method as described above with reference to any of FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a session controller for facilitating a connectivity check between a terminal device and a media gateway in a communication network, comprising:
   receiving, via a web gateway associated with said terminal device, a request for establishing a real-time communication call and an indication for indicating a capability of said terminal device for early reception of a connectivity parameter of said media gateway to be used in said connectivity;
   requesting, said media gateway in a H.248 ADD message to add two terminations, including both a terminal device side termination and a core side termination;
   receiving a reply from said media gateway in a H.248 ADD Reply message including said connectivity parameter, thereby obtaining said connectivity parameter from said media gateway, wherein said connectivity parameter includes Interactive Connectivity Establishment (ICE) attributes which are exchanged between said terminal device and said media gateway during ICE negotiation; and in response to said connectivity parameter being obtained, sending said connectivity parameter via said web gateway towards said terminal device within a time limit, wherein the connectivity parameter received after the time limit is ignored by the terminal device.

2. The method of claim 1, wherein said indication is included in said request.

3. The method of claim 1, wherein receiving said request and said indication comprises:
   receiving said indication via said web gateway during registration of said terminal device to said communication network; and
   receiving said request via said web gateway during initiation of said real-time communication call by said terminal device.

4. The method of claim 1, wherein sending said connectivity parameter towards said terminal device comprises:
   sending said connectivity parameter to said terminal device via said web gateway, immediately after obtaining said connectivity parameter from said media gateway.

5. A method implemented in a web gateway for facilitating a connectivity check between a terminal device associated with said web gateway and a media gateway in a communication network, comprising:
   receiving, from said terminal device, a request for establishing a real-time communication call and an indication for indicating a capability of said terminal device for early reception of a connectivity parameter of said media gateway to be used in said connectivity check;
   requesting, said media gateway in a H.248 ADD message to add two terminations, including both a terminal device side termination and a core side termination;
   receiving a reply from said media gateway in a H.248 ADD Reply message including said connectivity parameter, thereby obtaining said connectivity parameter from said media gateway;
   informing a session controller of said request and said indication;
   in response to the informing of said request and said indication, receiving said connectivity parameter from said session controller within a time limit, wherein said connectivity parameter includes Interactive Connectivity Establishment (ICE) attributes which are exchanged between said terminal device and said media gateway during ICE negotiation; and
   in response to said connectivity parameter being obtained, sending said connectivity parameter to said terminal device, wherein said connectivity parameter includes Interactive Connectivity Establishment (ICE) attributes which are exchanged between said terminal device and said media gateway during ICE negotiation; and
   wherein the connectivity parameter received after the time limit is ignored by the terminal device.

6. The method of claim 5, wherein said indication is included in said request.

7. The method of claim 5, wherein receiving said request and said indication comprises:
   receiving said indication from said terminal device during registration of said terminal device to said communication network; and
   receiving said request from said terminal device during initiation of said real-time communication call by said terminal device.

8. The method of claim 7, wherein informing of said request and said indication comprises:
   informing said session controller of said indication during said registration of said terminal device to said communication network; and
   informing said session controller of said request during said initiation of said real-time communication call by said terminal device.

9. A method implemented in a terminal device for facilitating a connectivity check between said terminal device and a media gateway in a communication network, comprising:
   sending, to a web gateway associated with said terminal device, a request for establishing a real-time communication call and an indication for indicating a capability of said terminal device for early reception of a connectivity parameter of said media gateway to be used in said connectivity check, wherein said media gateway in a H.248 ADD message adds two terminations, including both a terminal device side termination and a core side termination;
   informing a session controller of said request and said indication;
   in response to said request and said indication being sent, receiving said connectivity parameter from said web gateway within a time limit, wherein said connectivity parameter includes Interactive Connectivity Establishment (ICE) attributes which are exchanged between s aid terminal device and said media gateway during ICE negotiation; and
   said terminal device initiating the connectivity check with the media gateway after receiving said connectivity parameters; and
   wherein the connectivity parameter received after the time limit is ignored by the terminal device.

10. The method of claim 9, wherein said indication is included in said request.

11. The method of claim 9, wherein sending said request and said indication comprises:
    sending said indication to said web gateway during registration to said communication network; and
    sending said request to said web gateway during initiation of said real-time communication call.

* * * * *